(No Model.)
E. WESTON.
ELECTRICAL MEASURING INSTRUMENT.
No. 446,494. Patented Feb. 17, 1891.
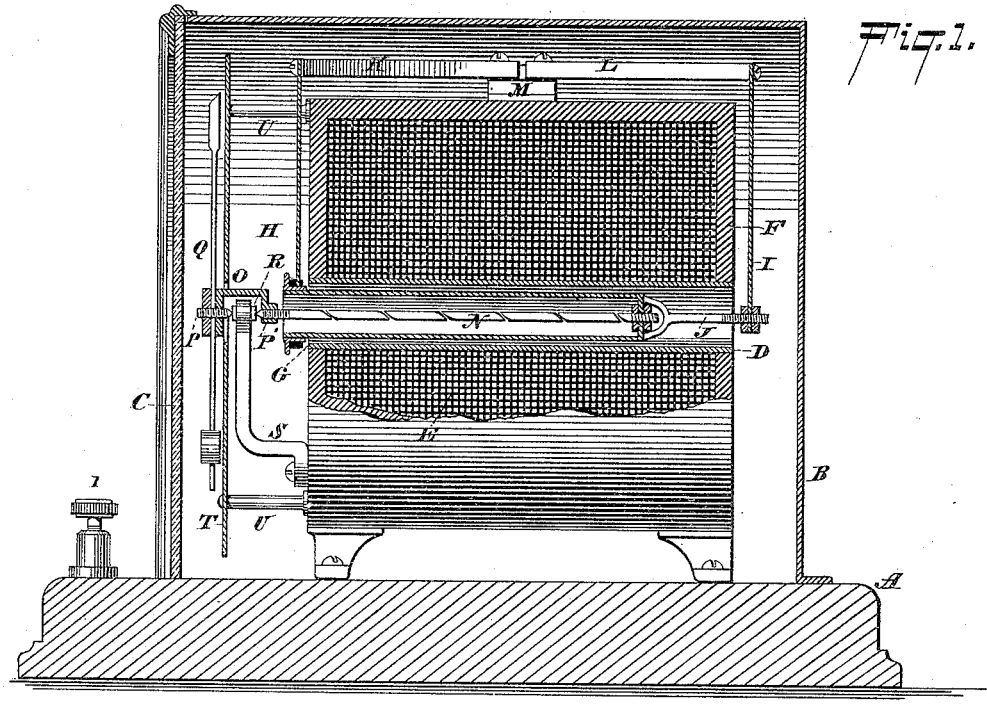
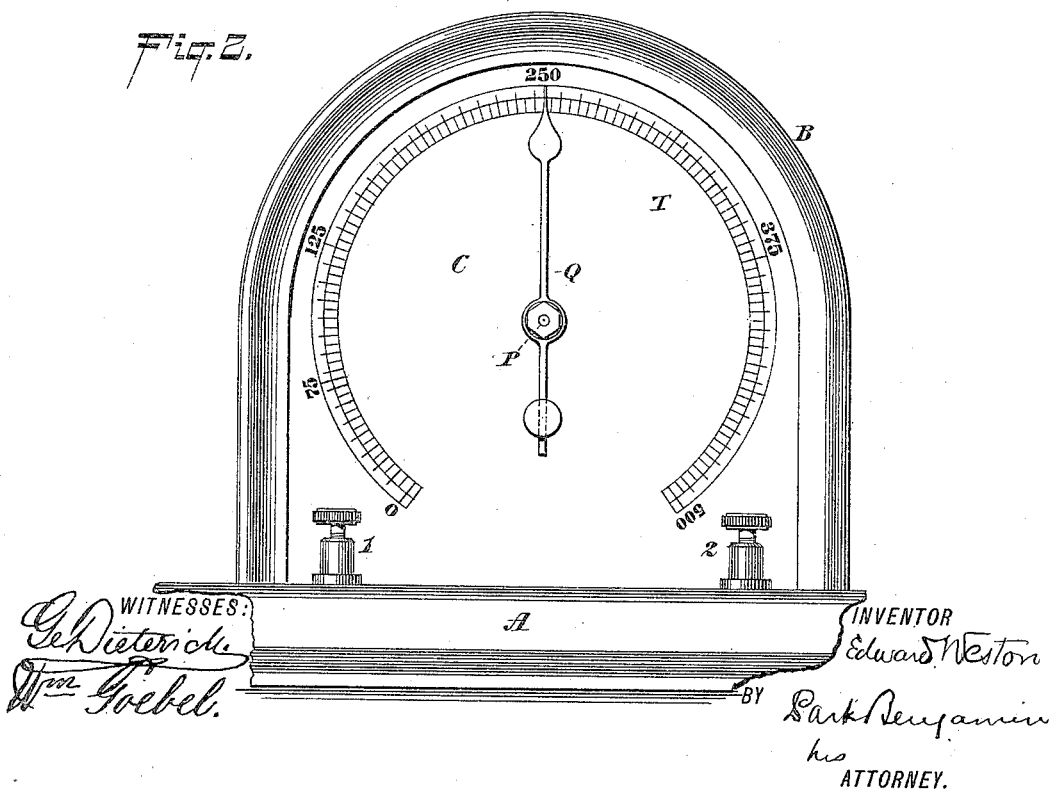

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 446,494, dated February 17, 1891.

Application filed October 16, 1890. Serial No. 368,277. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an instrument for measuring the difference in electrical potential between its terminals, and hence either current strength or current pressure.

My invention consists in the construction of the instrument, as hereinafter detailed, the principal features being the combination, with the solenoid in circuit, of the armature having an independent support and provided with means for transforming the bodily longitudinal movement of said armature into vibratory movement of an index over a scale and the arrangement of the solenoid in a magnetic screen for cutting over exterior inductive influences.

In the accompanying drawings, Figure 1 is a vertical longitudinal section, and Fig. 2 a front elevation, of my apparatus.

A is the base of the instrument, B an inclosing case, and C a glass front set in said case through which the movement of the needle over the scale may be observed.

D is a brass tube forming a core, upon which is wound the coil or solenoid of insulated wire E. This coil is wholly inclosed in the cylinder F, of iron.

G is an iron tube or armature supported at one end by the vertical spring H and at the other end by the vertical spring I. Spring I is connected to the closed end of the tube G by bar J, and the end of the bar J is screw-threaded, so that the tension of the springs H and I may be adjusted. The upper ends of the springs H and I are connected to metal bars K L, which are secured to the block M of insulating material on the top of the cylinder F.

N is a spiral spring having a threaded rod at one end, which is received in an extremity of the tube G. The other end of the spring N is attached to a threaded pivot-point which is attached to one arm of the yoke or stirrup O. Through the opposite arm of the yoke or stirrup O passes a threaded pin P, which secures the index-needle Q to said yoke and also serves as a pivot-pin. The pivot-pin P and the pivot-pin P' on the end of spring N are received in opposite sides of pivot-block R, which is supported from the fixed arm S.

T is the scale-plate, suitably marked, which is supported by standards U upon the front side of the cylinder F. The circuit in the instrument is simply from one binding-post 1 through the coil E to the other binding-post 2. The coil then becomes a sucking solenoid, of which the tube J is the armature, and when the current is established through the coil the tube G will be drawn into said coil in accordance with well-known laws for a distance bearing a relation to the strength of the current. As the tube G is drawn inward the spring N is extended, and therefore rotates, so turning the stirrup O on its pivot-pins P P', and thus moving the needle Q over the scale. The instrument may be used simply to measure difference of potential between terminals, in which case the coil E would be made of high resistance, or to indicate current strength, in which case the coil E would be made of low resistance. The scale-plate should be marked in units suitable to the employment of the instrument.

It will be observed that the cylinder F, of magnetic material, constitutes a complete shield to protect the instrument from the inductive effects of outside magnetism; also, that the armature G is supported by the springs H I entirely, and not in any wise by the spiral spring N, by which its movement is transmitted to the index-needle. The armature also being disposed horizontally, the action of gravity upon it does not interfere to accelerate or retard its motion.

I claim—

1. In an electrical measuring-instrument, a solenoid, a movable armature therein, a vibrating index, mechanism for transforming the axial bodily movement of said armature into vibratory movement of said index, and means independent of said transforming mechanism for supporting said armature.

2. In an electrical measuring-instrument, a solenoid, a movable armature horizontally disposed and independently supported therein, a vibrating index, and mechanism for transforming the axial bodily movement of said armature into vibratory movement of said index.

3. In an electrical measuring-instrument, a solenoid, a movable armature therein, a vibrating index, mechanism for transforming the axial bodily movement of said armature into vibratory movement of said index, and an independent spring-support for said armature.

4. In an electrical measuring-instrument, a solenoid, a tubular movable armature supported therein, an independent support for said armature, a vibrating index, and a spiral spring secured within said armature and communicating with said index, the said spring operating to transform the axial bodily movement of said armature into vibratory movement of said index.

5. In an electrical measuring-instrument, a solenoid, a tubular movable armature supported therein, an independent support for said armature, a vibratory index, a spiral spring secured within said armature and communicating with said index, and means for adjusting the tension of said spring, the said spring operating to transform the axial bodily movement of said armature into vibratory movement of said index.

6. In an electrical measuring-instrument, the combination of a solenoid, a spring-supported tubular armature within the same, a yoke or stirrup pivoted upon a fixed support received between its arms and extending into and secured within said armature, means for adjusting the tension of said spring, and an index actuated by said yoke.

EDWARD WESTON.

Witnesses:
K. W. ELY,
R. C. FESSENDEN.